US012620420B2

(12) United States Patent
Lu et al.

(10) Patent No.: US 12,620,420 B2
(45) Date of Patent: May 5, 2026

(54) FIXING DEVICE FOR DATE STORAGES AND HOST HAVING THE SAME

(71) Applicant: Fulian Precision Electronics (Tianjin) Co., LTD., Tianjin (CN)

(72) Inventors: Wen-Hu Lu, Tianjin (CN); Shu-Tong Wang, Tianjin (CN); Li-Yi Yin, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 141 days.

(21) Appl. No.: 18/383,106

(22) Filed: Oct. 24, 2023

(65) Prior Publication Data

US 2024/0257839 A1      Aug. 1, 2024

(30) Foreign Application Priority Data

Jan. 30, 2023    (CN) .......................... 202320152886.6

(51) Int. Cl.
G11B 33/12      (2006.01)
G11B 33/02      (2006.01)
(52) U.S. Cl.
CPC ............ G11B 33/123 (2013.01); G11B 33/02 (2013.01)

(58) Field of Classification Search
CPC ..... G11B 33/123; G11B 33/126; G11B 33/02; G11B 33/128; G06F 1/187
See application file for complete search history.

(56) References Cited

U.S. PATENT DOCUMENTS

| | | | |
|---|---|---|---|
| 7,499,286 B2 * | 3/2009 | Berke | .................. H05K 7/1487 |
| | | | 361/756 |
| 8,009,425 B2 * | 8/2011 | Kang | ................... G11B 33/127 |
| | | | 248/27.3 |
| 10,264,701 B1 * | 4/2019 | Norton | ................. H05K 7/1424 |

* cited by examiner

*Primary Examiner* — James Wu
(74) *Attorney, Agent, or Firm* — ScienBiziP, P.C.

(57)                ABSTRACT

A fixing device for placing data storages of different sizes includes a storage shelf, a separator plate, and at least two mounting brackets. The storage shelf defines a receiving space, the storage shelf includes a first wall and a second wall arranged at intervals along a first direction, the first wall and the second wall define the receiving space. The separator plate is detachably installed in the storage shelf to change a height of the receiving space along the first direction. The at least two mounting brackets have two different sizes and are detachably received in the receiving space for receiving the data storages. A host having the fixing device is also provided.

14 Claims, 10 Drawing Sheets

FIXING DEVICE FOR DATE STORAGES AND HOST HAVING THE SAME

FIELD

The subject matter herein generally relates to a field of data storage installation, and in particular to a fixing device for data storages and a host having the fixing device.

BACKGROUND

Data storages (such as Solid State Drive) have different specifications, and different specifications of data storages may have different sizes. Therefore, the storage shelf for fixing the data storages cannot accommodate the data storages with different sizes at the same time.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
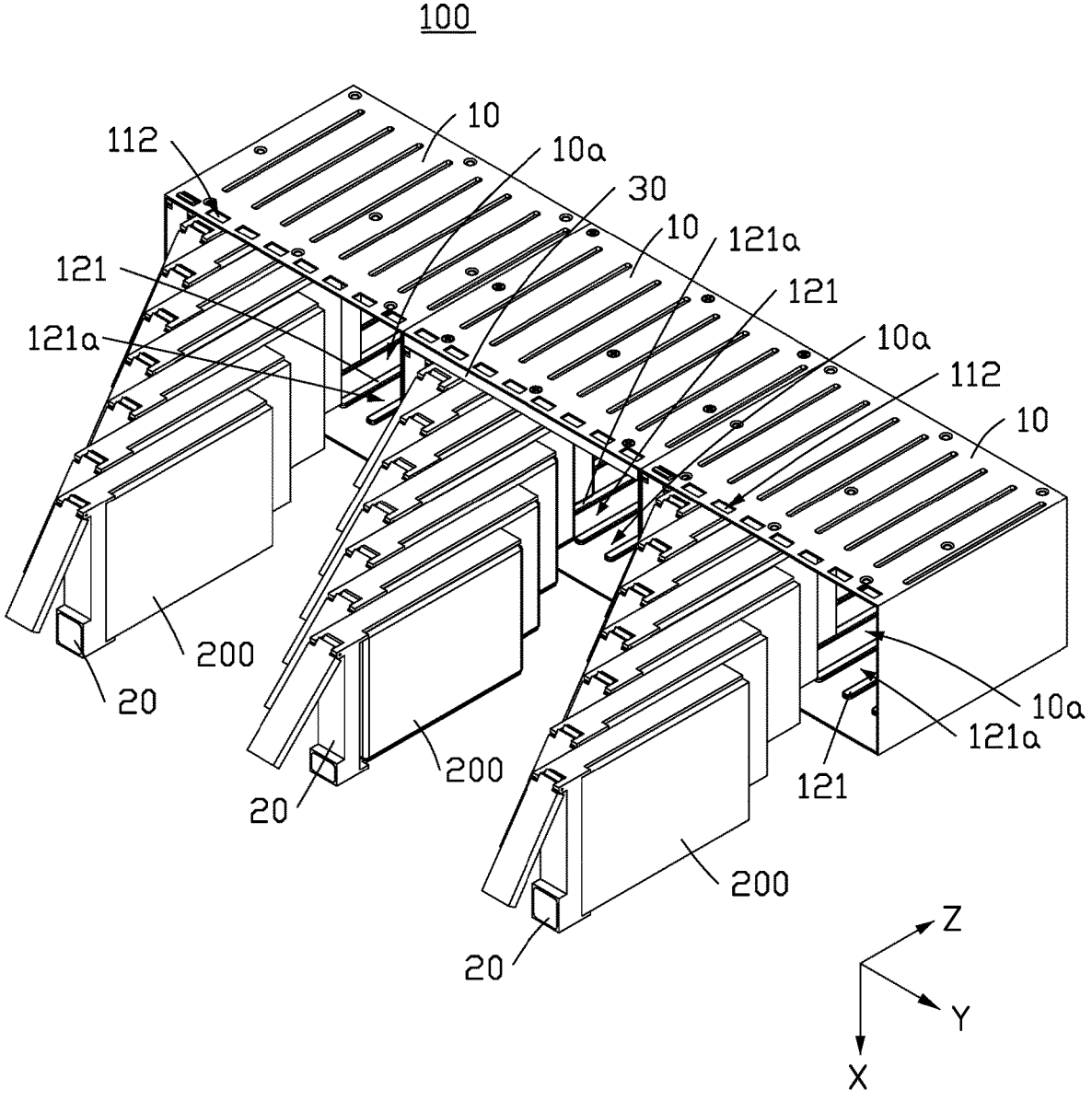
FIG. 1 is a schematic diagram of an embodiment of a fixing device for data storages according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIG. 1 illustrates an embodiment of a fixing device 100 for placing data storages of different sizes is provided. Each data storage may be a hard disk, a solid-state hard disk, or a CD drive.

Referring to FIG. 1, the fixing device 100 includes a storage shelf 10, at least one mounting bracket 20, and a separator plate 30. The storage shelf 10 defines a receiving space 10$a$. The at least one mounting bracket 20 is received in the storage shelf 10. The separator plate 30 is detachably installed in the storage shelf 10 to change a size of the receiving space 10$a$, so that the storage shelf 10 can be used to accommodate mounting brackets 20 of different sizes.

Figure 2:
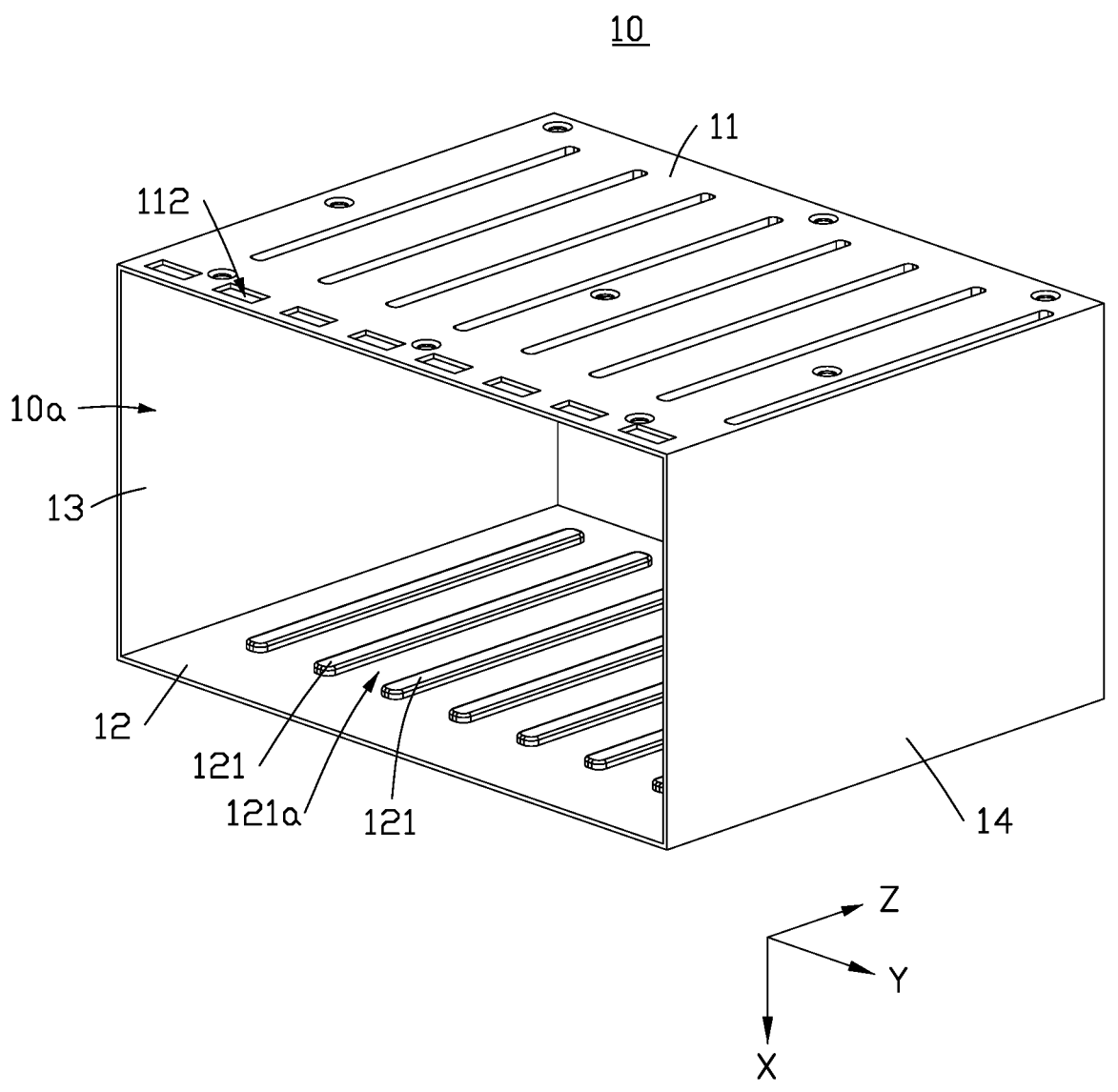
FIG. 2 is a schematic diagram of an embodiment of a storage shelf according to the present disclosure.

Referring to FIG. 1 and FIG. 2, the storage shelf 10 includes a first wall 11, a third wall 13, a second wall 12, and a fourth wall 14 connected end to end. The receiving space 10$a$ is defined by the first wall 11, the second wall 12, the third wall 13 and the fourth wall 14. In at least one embodiment, the first wall 11 and the second wall 12 are arranged at intervals along a first direction X, the third wall 13 and the fourth wall 14 are arranged at intervals along a second direction Y, the first direction X may be perpendicular to the second direction Y The separator plate 30 is detachably received in the receiving space 10$a$ to change a height of the receiving space 10$a$ in the first direction X.

Figure 3:
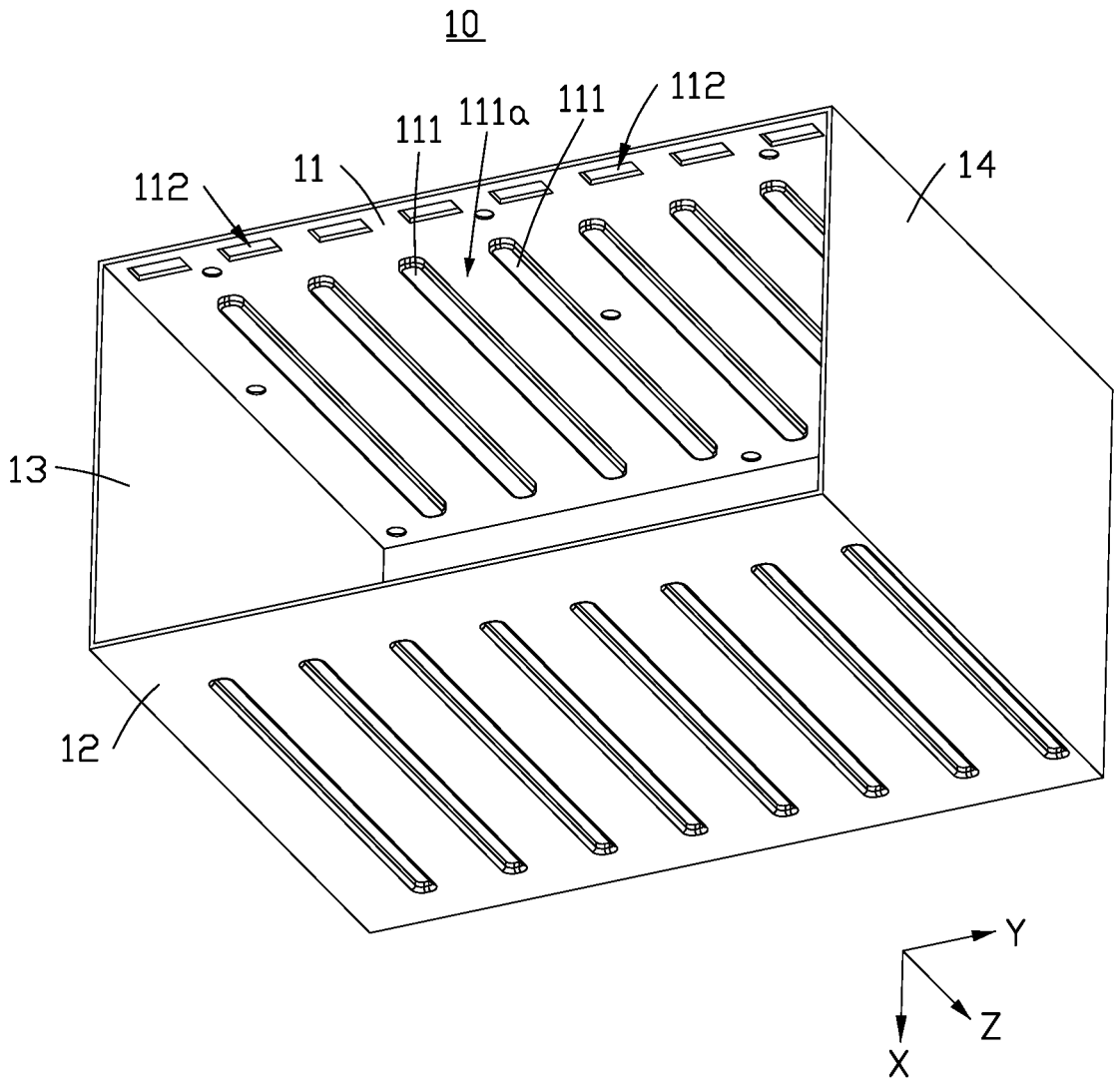
FIG. 3 is a schematic diagram of an embodiment of a storage shelf from another angle according to the present disclosure.

Referring to FIG. 2 and FIG. 3, in at least one embodiment, a side of the first wall 11 facing the second wall 12 may be provided with a plurality of first protrusions 111 arranged at intervals in the second direction Y. Each of the plurality of first protrusions 111 extends in a third direction Z, the third direction Z is perpendicular to the first direction X and the second direction Y. Any two adjacent first protrusions 111 of the plurality of first protrusions 111 defines a first recess 111$a$. The first recess 111$a$ is used to receive an end portion of the mounting bracket 20. The mounting bracket 20 can slide along the third direction Z in the first recess 111$a$, so as to facilitate taking out and installing the mounting bracket 20.

In at least one embodiment, a side of the second wall 12 facing the first wall 11 is provided with a plurality of second protrusions 121 arranged at intervals in the second direction Y Each of the plurality of second protrusions 121 extends in the third direction Z. Any two adjacent second protrusions 121 of the plurality of second protrusions 121 defines a second recess 121$a$. Each first recess 111$a$ corresponds to one second recess 121$a$. The first recess 111$a$ and the corresponding second recess 121$a$ are used to receive opposite end portions of the mounting bracket 20. The mounting bracket 20 can slide along the third direction Z in the first recess 111$a$ and the corresponding second recess 121$a$, which further facilitates taking out and installing the mounting bracket 20. In at least one embodiment, in the second direction Y, a width of the first recess 111$a$ and a width of the corresponding second recess 121$a$ may be the same. In at least one embodiment, in the second direction Y, a sum of the width of the first recess 111$a$ and widths of two adjacent first protrusions 111 defining the first recess 111*a* may be greater than a width of the mounting bracket 20. In at least one embodiment, in the second direction Y, the width of the first recess 111*a* may be greater than the width of the mounting bracket 20.

In at least one embodiment, a plurality of first holes 112 arranged at intervals in the second direction Y is recessed inwardly from a surface of the first wall 11 facing the second wall 12. Each of the plurality of first holes 112 may extend through the first wall 11 in the first direction X. In at least one embodiment, the plurality of first holes 112 may be arranged close to an edge of the first wall 11 in the third direction Z. Each of the plurality of first holes 112 is used to cooperate with the mounting bracket 20 to limit the mounting bracket 20 in the first recess 111*a* and the second recess 121*a*.

Figure 4:
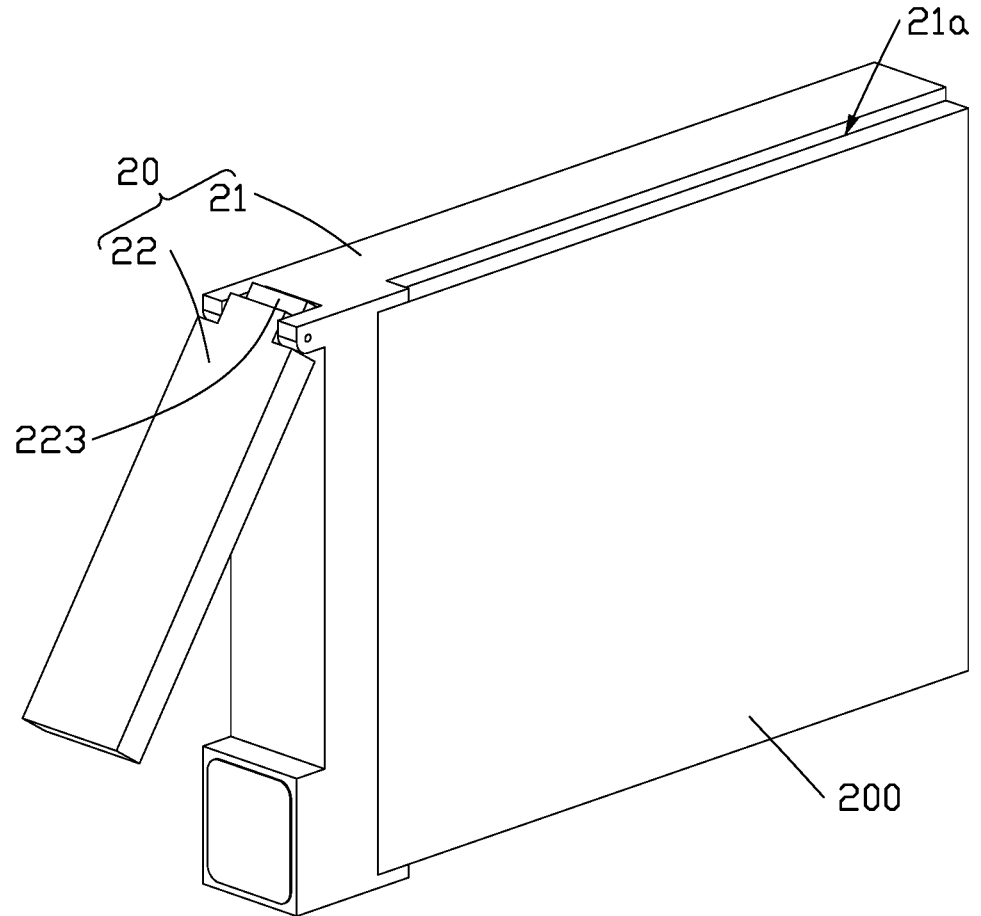
FIG. 4 is a schematic diagram of an embodiment of a mounting bracket for receiving a data storage according to the present disclosure.
Figure 5:
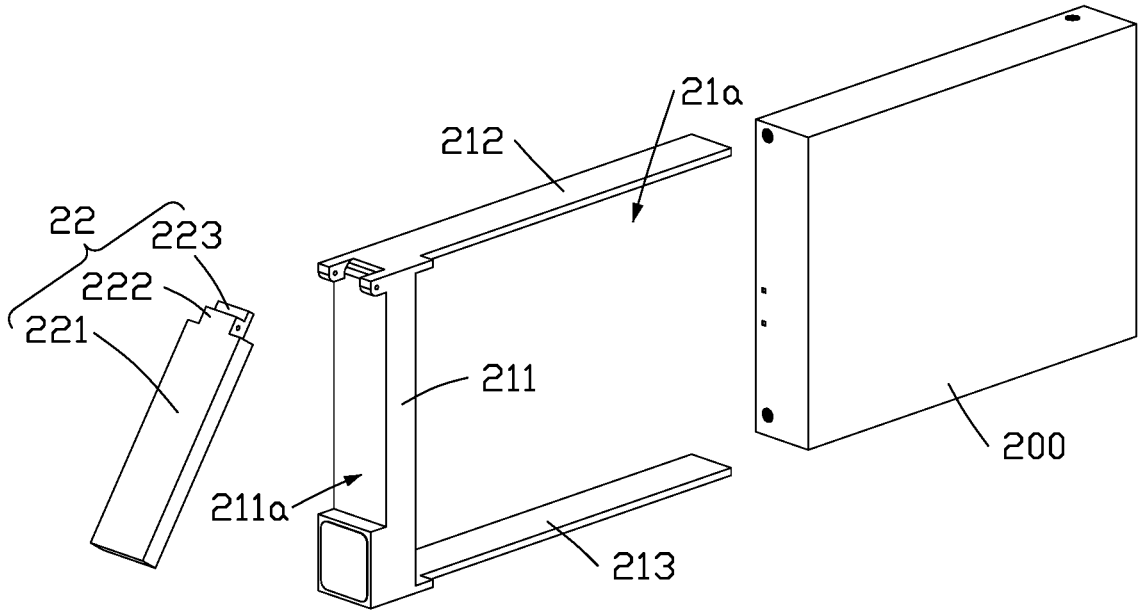
FIG. 5 is an exploded, diagrammatic view of an embodiment of the mounting bracket and the data storage of FIG. 4.
Figure 6:
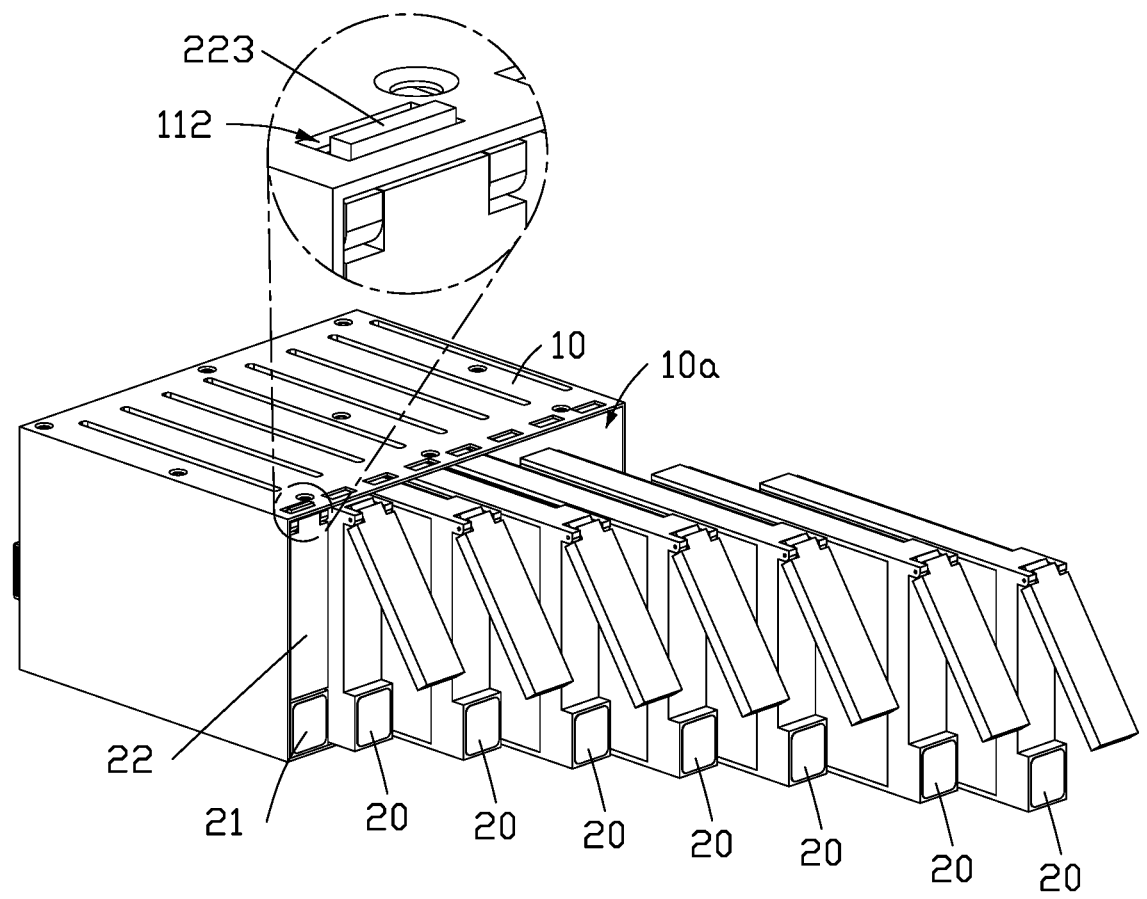
FIG. 6 is a schematic diagram of an embodiment of a fixing device for data storages according to the present disclosure.

Referring to FIG. 4, FIG. 5, and FIG. 6, in at least one embodiment, the mounting bracket 20 may include a main body 21 and a fixing member 22, the main body 21 is used for installing a data storage 200. The main body 21 is slidably received in at least one of the first recess 111*a* and the second recess 121*a*. The fixing member 22 is rotatably connected to the main body 21. An end portion of the fixing member 22 protrudes from one side of the main body 21 for cooperating with the first hole 112 to fix the main body 21 in the receiving space 10*a*, which can improve the stability of the main body 21 in the storage shelf 10.

In at least one embodiment, the main body 21 may include a connecting portion 211, a first supporting portion 212, and a second supporting portion 213. The first supporting portion 212 and the second supporting portion 213 are arranged at intervals in the first direction X. The first supporting portion 212 and the second supporting portion 213 are connected by the connecting portion 211, and a mounting space 21*a* is defined by the connecting portion 211, the first supporting portion 212, and the second supporting portion 213 for receiving the data storage 200. In at least one embodiment, the first supporting portion 212 is slidably received in the first recess 111*a*, the second supporting portion 213 is slidably received in the second recess 121*a*, so that the data storage 200 can be driven to be received in the receiving space 10*a* or moved out of the receiving space 10*a*.

In at least one embodiment, the fixing member 22 includes a first portion 221, a second portion 222 and a third portion 223 connected in sequence. The second portion 222 is rotatably connected to the connecting portion 211 and the fixing member 22 is located on a side of the connecting portion 211 away from the mounting space 21*a*. The third portion 223 is the end portion of the fixing member 22, and the third portion 223 protrudes from the first supporting portion 212 in a direction away from the second supporting portion 213 for cooperating with the first hole 112. When an end of the first portion 221 away from the second portion 222 is moved close to the connecting portion 211, the fixing member 22 rotates around the second portion 222, so that a height of the third portion 223 protruding from the first supporting portion 212 in the third direction Z is increased, which facilitate inserting the third portion 223 into the first hole 112 to fix the main body 21 and the storage shelf 10. When the end of the first portion 221 away from the second portion 222 is moved away from the connecting portion 211, the fixing member 22 rotates around the second portion 222, so that a height of the third portion 223 protruding from the first supporting portion 212 in the third direction Z is reduced, so that the third portion 223 can be easily disengaged from the first hole 112, thereby facilitating removal of the main body 21 from the storage shelf 10.

In at least one embodiment, a receiving groove 211*a* for receiving the first portion 221 and the second portion 222 is recessed inwardly from a surface of the connecting portion 211 facing away from the mounting space 21*a*.

Figure 7:
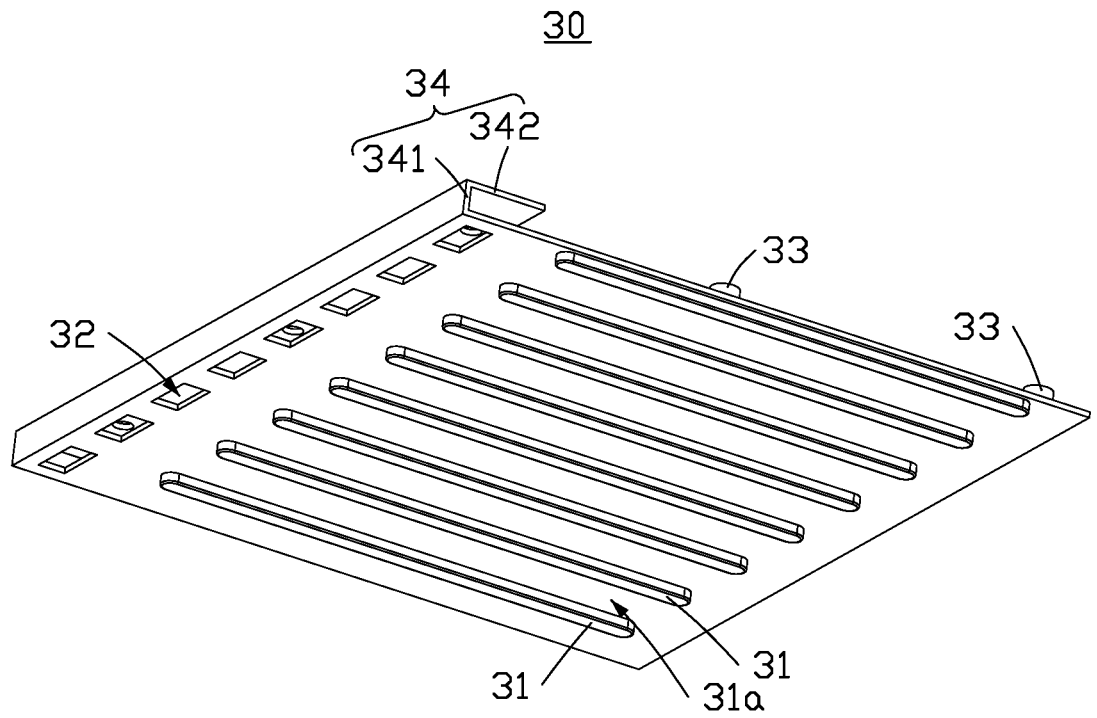
FIG. 7 is a schematic diagram of an embodiment of a separator plate according to the present disclosure.
Figure 8:
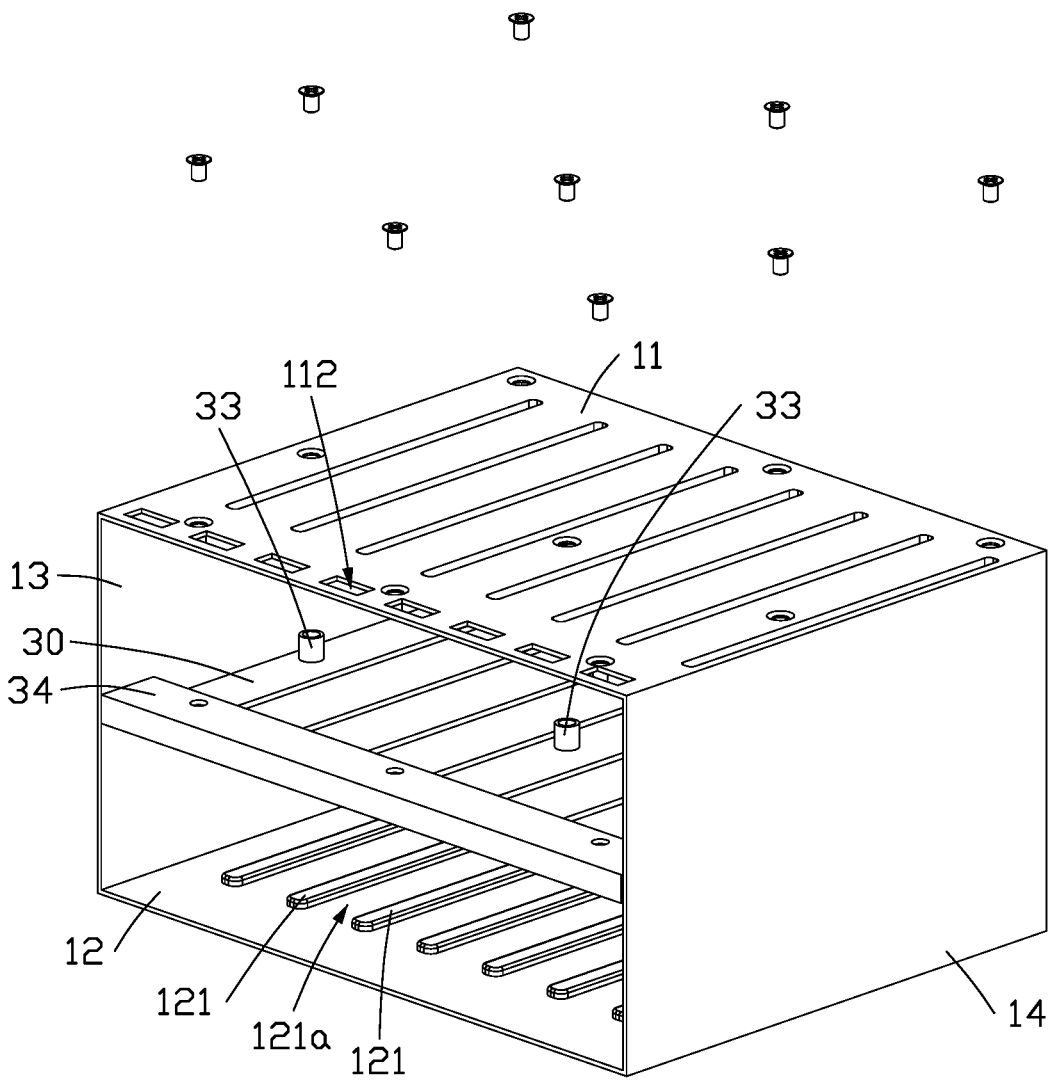
FIG. 8 is a partially exploded, diagrammatic view of an embodiment of a storage shelf with a separator plate according to the present disclosure.
Figure 9:
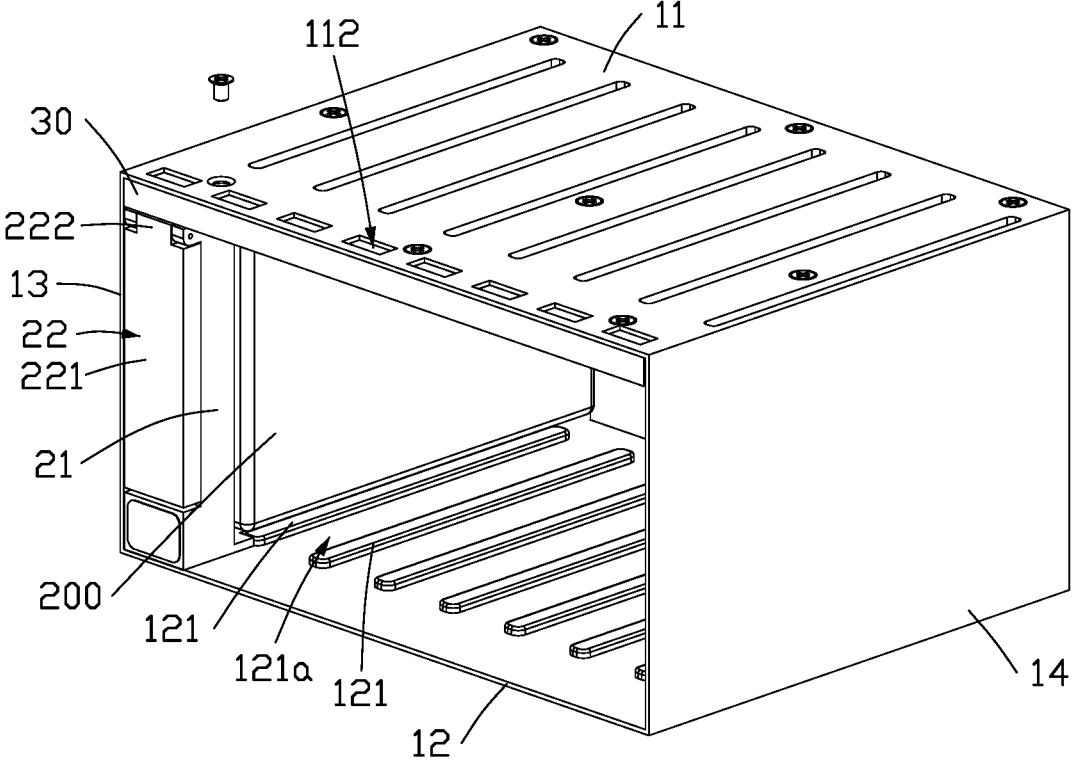
FIG. 9 is a partially exploded, diagrammatic view of an embodiment of a fixing device for data storages according to the present disclosure.

Referring to FIG. 7, FIG. 8, and FIG. 9, in at least one embodiment, the separator plate 30 may be detachably fixed on the first wall 11 to change the size of the receiving space 10*a* to receive the mounting brackets 20 with smaller sizes. A surface of the separator plate 30 facing the second wall 12 is provided with a plurality of the third protrusions 31 arranged at intervals in the second direction Y. Each of the plurality of the third protrusions 31 extends in the third direction Z. Any two adjacent third protrusions 31 of the plurality of the third protrusions 31 defines a third recess 31*a*. Each third recess 31*a* corresponds to one second recess 121*a*, the third recess 31*a* and the corresponding second recess 121*a* cooperate with each other to receive opposite end portions of the mounting bracket 20. The mounting bracket 20 can slide along the third direction Z in the third recess 31*a* and the corresponding second recess 121*a*, which further facilitates taking out and installing the mounting bracket 20. In at least one embodiment, in the second direction Y, a width of the third recess 31*a* and a width of the corresponding second recess 121*a* may be the same.

In at least one embodiment, a plurality of second holes 32 arranged at intervals in the second direction Y is defined by the separator plate 30. Each of the plurality of second holes 32 extends through the separator plate 30 in the first direction X. In at least one embodiment, the plurality of second holes 32 is arranged close to an edge of the separator plate 30 in the third direction Z. Each of the plurality of second holes 32 is used to cooperate with the third portion 223 to fix the mounting bracket 20 in the third recess 31*a* and the corresponding second recess 121*a*.

In at least one embodiment, a surface of the separator plate 30 facing the first wall 11 is provided with a plurality of extending portions 33 for connecting the first wall 11. A fastener extends through the first wall 11 and connects one of the plurality of extending portions 33 to detachably fix the separator plate 30 to the first wall 11. The fastener may be a screw. In at least one embodiment, the separator plate 30 may be detachably fixed on the first wall 11 by means of bonding or buckling.

In at least one embodiment, the edge of the separator plate 30 in the third direction Z close to the plurality of second holes 32 is provided with a bent portion 34. The bent portion 34 is connected to the surface of the separator plate 30 facing the first wall 11. The bent portion 34 may include a first part 341 and a second part 342. The first part 341 extends along the first direction X from a surface the separator plate 30 facing the first wall 11. The second part 342 extends along the third direction Z from an end of the first part 341 away from the surface the separator plate 30 facing the first wall 11. In at least one embodiment, the second part 342 may cover the plurality of second holes 112.

When the above-mentioned fixing device 100 is in use, by installing the separator plate 30 on the storage shelf 10 and dismounting the separator plate 30 from the storage shelf 10, the mounting brackets 20 of different sizes can be fixed in the storage rack 10, so that the same storage rack 10 can be used for fixing data storages of different sizes.

In at least one embodiment, referring to FIG. 1, the fixing device 100 includes at least two storage shelfs 10 and at least two mounting brackets 20 having two sizes. At least one of the at least two storage shelfs 10 is provided with the separator plate 30, the other of the storage shelfs 10 is provided without the separator plate 30. At least one of the at least two mounting brackets 20 with a smaller size is installed in the storage shelf 10 with the separator plate 30, and the other of the at least two mounting brackets 20 with a greater size is installed in the storage shelf 10 without the separator plate 30.

Figure 10:
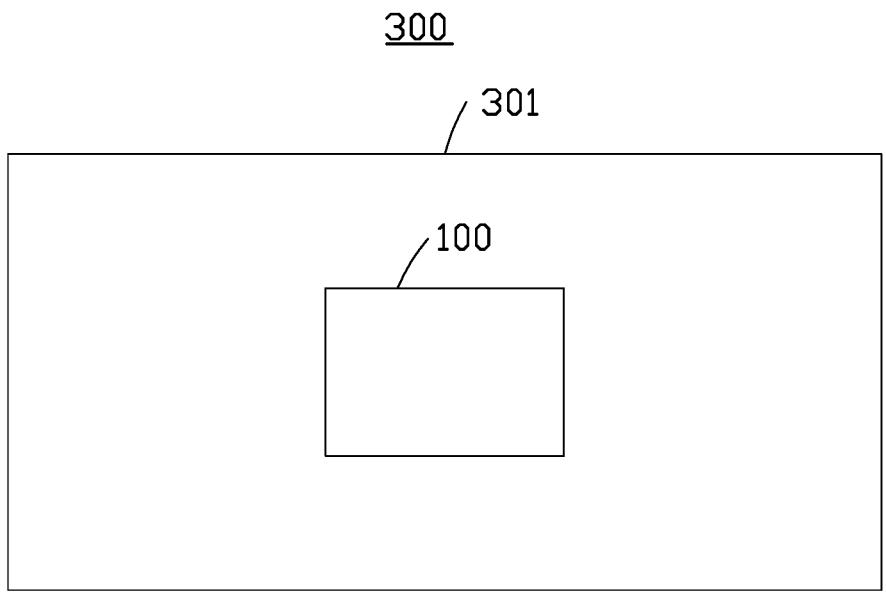
FIG. 10 is a schematic diagram of an embodiment of a host according to the present disclosure.

FIG. 10 illustrates an embodiment of a host 300 having the fixing device 100. The host 300 further includes a cabinet 301. The fixing device 100 is received in the cabinet 301.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A fixing device for placing data storages of different sizes, comprising:

a storage shelf defining a receiving space, the storage shelf comprising a first wall and a second wall arranged at a distance along a first direction, the first wall and the second wall defining the receiving space;

a separator plate detachably installed in the storage shelf to change a height of the receiving space along the first direction;

at least two mounting brackets having two different sizes and detachably received in the receiving space for receiving the data storages; and a plurality of first holes arranged at a distance in a second direction, wherein the plurality of first holes is recessed inwardly from a side of the first wall facing the second wall, the second direction and the first direction are perpendicular to each other, each of the at least two mounting brackets comprises a main body configured for installing one of the data storages and a fixing member rotatably connected to the main body, a plurality of second holes arranged at intervals in the second direction are defined by the separator plate, each of the plurality of second holes extends through the separator plate in the first direction, a height of an end portion of the fixing member of at least one of the at least two mounting brackets protruding from one side of the main body along a third direction perpendicular to the first direction and the second direction is adjustable by rotating the fixing member into or out of one of the plurality of first holes or by rotating the fixing member into or out of one of the plurality of second holes.

2. The fixing device of claim 1, wherein the side of the first wall facing the second wall is provided with a plurality of first protrusions arranged at intervals in the second direction, each of the plurality of first protrusions extends in the third direction, any two adjacent first protrusions of the plurality of first protrusions defines a first recess, a side of the second wall facing the first wall is provided with a plurality of second protrusions arranged at intervals in the second direction, each of the plurality of second protrusions extends in the third direction, any two adjacent second protrusions of the plurality of second protrusions defines a second recess, each of the second recesses corresponds to a corresponding first recess, each of the second recesses and the corresponding first recess are configured to receive opposite end portions of one of at least one of the at least two mounting brackets.

3. The fixing device of claim 2, wherein a surface of the separator plate facing the second wall is provided with a plurality of third protrusions arranged at intervals in the second direction, each of the plurality of third protrusions extends in the third direction, any two adjacent third protrusions of the plurality of third protrusions defines a third recess, each of the second recesses corresponds to a corresponding third recess, each of the second recesses and the corresponding third recess are configured to receive opposite end portions of one of the other of the at least two mounting brackets.

4. The fixing device of claim 3, wherein the main body comprises a connecting portion, a first supporting portion, and a second supporting portion, the first supporting portion and the second supporting portion are arranged at a distance in the first direction, the first supporting portion and the second supporting portion are connected by the connecting portion, a mounting space for receiving the data storage is defined by the connecting portion, the first supporting portion, and the second supporting portion, the second supporting portion is slidably received in the second recess, the first supporting portion is slidably received in the first recess or the third recess.

5. The fixing device of claim 3, wherein in the second direction, a width of the second recess, a width of the corresponding first recess, and a width of the corresponding third recess are the same.

6. The fixing device of claim 3, wherein an edge of the separator plate in the third direction close to the plurality of second holes is provided with a bent portion, the bent portion is connected to a surface of the separator plate facing the first wall, the bent portion comprises a first part and a second part, the first part extends along the first direction from the surface the separator plate facing the first wall, the second part extends along the third direction from an end of the first part away from the surface the separator plate facing the first wall.

7. The fixing device of claim 6, wherein the second part covers the plurality of second holes.

8. A host comprising:

a cabinet; and a fixing device for placing data storages of different sizes received in the cabinet, the fixing device comprising:

a storage shelf defining a receiving space, the storage shelf comprising a first wall and a second wall arranged at a distance along a first direction, the first wall and the second wall defining the receiving space;

a separator plate detachably installed in the storage shelf to change a height of the receiving space along the first direction;

at least two mounting brackets having two different sizes and detachably received in the receiving space for receiving the data storages; and a plurality of first holes arranged at a distance in the second direction, wherein the plurality of first holes is recessed inwardly from a side of the first wall facing the second wall, the second direction and the first direction are perpendicular to each other, each of the at least two mounting brackets comprises a main body for installing one of the data storages and a fixing member rotatably connected to the main body, a plurality of second holes arranged at intervals in the second direction are defined by the separator plate, each of the plurality of second holes extends through the separator plate in the first direction, a height of an end portion of the fixing member of at least one of the at least two mounting brackets protruding from one side of the main body along a third direction perpendicular to the first direction and the second direction is adjustable by rotating the fixing member into or out of one of the plurality of first holes or by rotating the fixing member into or out of one of the plurality of second holes.

9. The host of claim 8, wherein the side of the first wall facing the second wall is provided with a plurality of first protrusions arranged at intervals in the second direction, each of the plurality of first protrusions extends in the third direction, any two adjacent first protrusions of the plurality of first protrusions defines a first recess, a side of the second wall facing the first wall is provided with a plurality of second protrusions arranged at intervals in the second direction, each of the plurality of second protrusions extends in the third direction, any two adjacent second protrusions of the plurality of second protrusions defines a second recess, each of the second recesses corresponds to a corresponding first recess, each of the second recesses and the corresponding first recess are configured to receive opposite end portions of one of at least one of the at least two mounting brackets.

10. The host of claim 9, wherein a surface of the separator plate facing the second wall is provided with a plurality of third protrusions arranged at intervals in the second direction, each of the plurality of third protrusions extends in the third direction, any two adjacent third protrusions of the plurality of third protrusions defines a third recess, each of the second recesses corresponds to a corresponding third recess, each of the second recesses and the corresponding third recess are configured to receive opposite end portions of one of the other of the at least two mounting brackets.

11. The host of claim 10, wherein the main body comprises a connecting portion, a first supporting portion, and a second supporting portion, the first supporting portion and the second supporting portion are arranged at a distance in the first direction, the first supporting portion and the second supporting portion are connected by the connecting portion, a mounting space for receiving the data storage is defined by the connecting portion, the first supporting portion, and the second supporting portion, the second supporting portion is slidably received in the second recess, the first supporting portion is slidably received in the first recess or the third recess.

12. The host of claim 10, wherein in the second direction, a width of the second recess, a width of the corresponding first recess, and a width of the corresponding third recess are the same.

13. The host of claim 10, wherein an edge of the separator plate in the third direction close to the plurality of second holes is provided with a bent portion, the bent portion is connected to a surface of the separator plate facing the first wall, the bent portion comprises a first part and a second part, the first part extends along the first direction from the surface the separator plate facing the first wall, the second part extends along the third direction from an end of the first part away from the surface the separator plate facing the first wall.

14. The host of claim 13, wherein the second part covers the plurality of second holes.

* * * * *